(12) United States Patent
Boettiger

(10) Patent No.: US 8,082,266 B2
(45) Date of Patent: *Dec. 20, 2011

(54) INDEX FOR DATA RETRIEVAL AND DATA STRUCTURING

(75) Inventor: Volker Boettiger, Munich (DE)

(73) Assignee: International Business Machines Corporation, Armonk, NY (US)

( * ) Notice: Subject to any disclaimer, the term of this patent is extended or adjusted under 35 U.S.C. 154(b) by 521 days.

This patent is subject to a terminal disclaimer.

(21) Appl. No.: 12/202,299

(22) Filed: Aug. 31, 2008

(65) Prior Publication Data

US 2008/0319954 A1  Dec. 25, 2008

Related U.S. Application Data

(63) Continuation of application No. 11/033,898, filed on Dec. 2, 2004, now Pat. No. 7,509,306.

(30) Foreign Application Priority Data

Dec. 8, 2003  (DE) .................................. 031045933

(51) Int. Cl.
*G06F 17/30* (2006.01)
(52) U.S. Cl. ........................................ 707/769; 715/205
(58) Field of Classification Search .................. 707/609, 707/705, 713, 769, 791, 802; 715/205, 751, 715/804

See application file for complete search history.

(56) References Cited

U.S. PATENT DOCUMENTS 6,094,649 A * 7/2000 Bowen et al. ................. 707/711
6,366,923 B1   4/2002 Lenk et al.
6,961,896 B1  11/2005 Rousselle et al.

OTHER PUBLICATIONS

Lashinal, et al. "The context aware personal remote control: a case study awareness," May 2003, IEEE, pp. 233-327.
Response to Office Action, U.S. Appl. No. 11/003,898, Feb. 19, 2007.
Powermarks: Powermarks by Kaylon Technologies, Bookmark Manager and Personal Search Engine, Apr. 21, 2004, http://www.kaylon.com/power.html (pp. 1-3).
Hyperwave—The Power of Wisdom—Enterprise Content Management, Apr. 21, 2004, http:/www.hyperwave.com (p. 1).
IEEE Xplore Release 2.5, Mar. 28, 2008, http://ieeexplore.ieee.org/search/searchresult.jsp?queryTex...age=0&resultStart=0&srchlist=publist&coll8=modules&disp+cit (pp. 1-4).

* cited by examiner

*Primary Examiner* — Fred I Ehichioya
(74) *Attorney, Agent, or Firm* — Sawyer Law Group, P.C.

(57) ABSTRACT

Generating an index for a retrieval of data provided by at least one document. Data is selected within the at least one document, a category is assianed to the selected data, a timestamp is assianed to the selected data, and a location indication to the selected data is determined. The selected data, the category, the timestamp, and the location indication of the selected data are stored as an entry of the index. The present invention therefore provides an effective and universally adaptive tool for contextual structuring and retrieval of data distributed over a plurality of electronic documents.

32 Claims, 6 Drawing Sheets

INDEX FOR DATA RETRIEVAL AND DATA STRUCTURING

CROSS-REFERENCE TO RELATED APPLICATIONS

Under 35 U.S.C. §120 the present Application is a continuation of U.S. patent application Ser. No. 11/003,898, filed Dec. 2, 2004, entitled "INDEX FOR DATA RETRIEVAL AND DATA STRUCTURING", all of which is incorporated herein by reference.

FIELD OF THE INVENTION

The present invention relates generally to the field of structuring and retrieving data provided by a multiplicity of documents.

BACKGROUND OF THE INVENTION

Retrieval of data, which is stored in a large computer system or computer network system has been extremely facilitated by making use of search engines. A user seeking data or information related to a certain topic initiates a search query by entering a search term and obtains a list of links pointing to relevant documents corresponding to the search terms.

The search engine seeks for terms within the multiplicity of provided documents that match the search terms and provides a hyperlink to the user being indicative about the location of a relevant retrieved document.

However, the search terms might not be unambiguous and the information or data content of the documents found by the search engine may not fulfill the user request at all. Typically a rating whether retrieved documents match the query of the user has to be performed manually by the user. A user successively requests the provided documents with the help of the links provided by the search result. While browsing through a provided document the user judges whether the document matches the initial search query.

While browsing through a multiplicity of provided documents the user may find more or less relevant documents or distinct fragments of documents, that are of certain interest. Especially when the provided links of a search result point to different documents, which is common for documents provided in the world wide web, the user may lose overview over the distinct information content of the retrieved documents. Moreover, the user may have retrieved a very relevant fragment of information but does not remember in which of the retrieved or browsed documents this particular information fragment is located.

In order to provide contextual structuring of information as well as efficient data retrieval or data recovery, various techniques have been implemented in the prior art.

For example, the Microsoft Internet Explorer of Microsoft Corporation as well at Netscape Communicator of Netscape Communications Corporation, both provide an approach for an easy discovery of pages or documents that have been accessed during browsing in form of a list of favorites or bookmarks. For example a user, surfing the internet by making use of the above described products, can mark a relevant page or a relevant document and can add a location indication as well as a description of the relevant document or page to the list of bookmarks or favorites. In order to recover such a relevant document the user selects a corresponding item of the list of favorites or bookmarks. By selecting such a list item, the browser provides the corresponding document or the corresponding page to the user.

The bookmarks or favorites can be stored in different folders indicating different categories. In this way the bookmarks or favorites are structured in an hierarchical way inhibiting an effective or easy restructuring of the list of bookmarks or favorites.

The Hyperwave IS/6 product of Hyperwave AG (cf. http://www.hyperwave.com) provides a knowledge management platform incorporating various functions of document management, content management as well as information retrieval and enterprise information portals. The Hyperwave structured web document management system provides both an infrastructure and numerous navigational tools based upon it: hierarchical structuring, hyperlinking and dynamic link maps, meta data attributes, content and attribute search as well as 3D information landscapes. Hyperwave especially allows to manage hyperlinked documents with a separate link database. In this way hyperlink relationships between documents can be obtained without having to retrieve the documents themselves. This allows navigable, graphical link maps of both incoming and outgoing links to be generated on demand. In this case hyperlinks not only refer to standard (referential) links but also to annotations, inlines and textures.

These various types of links can be used to filter the result of a search for link objects or to reduce the clutter in a graphical link map. The Hyperwave document management system is mainly suited for a company specific intranet rather than suited for a private user surfing the internet. The various products and solutions supported by Hyperwave are all based on a Hyperwave specific platform Hyperwave IS/6. The implementation of such a document management system is rather complex and causes appreciable costs.

There exists a variety of different solutions for contextual structuring of distributed data or distributed information focusing on bookmark management. For example the URL Manager Pro (cf. http://www.url-manager.com) is a bookmark manager for the Macintosh computer. This product provides an access to bookmarks in any application through a system-wide menu. Bookmarks stored in URL Manager Pro bookmark files can be stored and manipulated in an intuitive way.

The Powermarks, a bookmarking tool with search facility, commercially distributed by Kaylon Technologies Incorporated provides a variety of features such as storing, synchronizing and backing up of bookmarks on the internet, rating of bookmarks, a user defined bookmark field for application specific information, a fetch command to automatically retrieve name, description and keywords of page given a URL, a customizable bookmark viewer, a keyword browser for easy viewing of keywords as well as a synchronization feature with browser bookmarks. In contrast to web browsers such as the Internet Explorer and Netscape Communicator, Powermarks does not store bookmarks in folders, instead they are stored in a flat, non- hierarchical list.

As a replacement for folders, Powermarks uses keywords and an instantaneous search facility. To access groups of bookmarks, common keywords can be added to related bookmarks. For example a search for a distinct bookmark can be based on a keyword which is assigned to the distinct bookmark. Such a keyword search locates bookmarks by matching the keywords typed in the search field with words in the keyword field of the bookmark. The list in which the bookmarks are stored can be rearranged according to a user's preference.

Performing a right mouse click anywhere on the column headings of the list displays a menu for selecting which bookmark properties to display. The column headings can be reordered by holding down the Ctrl key of the keyboard and using the left mouse button to drag and drop the column headings. By left clicking on a column heading the list is sorted according to this column.

Contextual structuring by making use of bookmark or favorite techniques only provides a retrieval and structuring of documents or pages that are categorized by a unique address (such as an URL) or a distinct path of a computer file system. Furthermore, a distinct fragment of a document can be bookmarked and recovered later on only when the fragment is assigned to a hyperlink.

The definition and placement of hyperlinks within a document is solely defined and implemented by the author of the document. The reader instead has no possibility to define and to set different bookmarks according to his or her preferences.

The present invention therefore aims to provide an improved method for structuring and retrieving of data provided by a multiplicity of electronic documents.

Accordingly, what is needed is a system and method for providing an improved method for structuring and retrieving of data provided by a multiplicity of electronic documents. The present invention addresses such a need.

SUMMARY OF THE INVENTION

The present invention provides a computer system and computer readable medium for generating an index for a retrieval of data provided by at least one document. Data is selected within the at least one document, a category is assianed to the selected data, a timestamp is assianed to the selected data, and a location indication to the selected data is determined. The selected data, the category, the timestamp, and the location indication of the selected data are stored as an entry of the index.

The present invention therefore provides an effective and universally adaptive tool for contextual structuring and retrieval of data distributed over a plurality of electronic documents.

DETAILED DESCRIPTION

Figure 1:
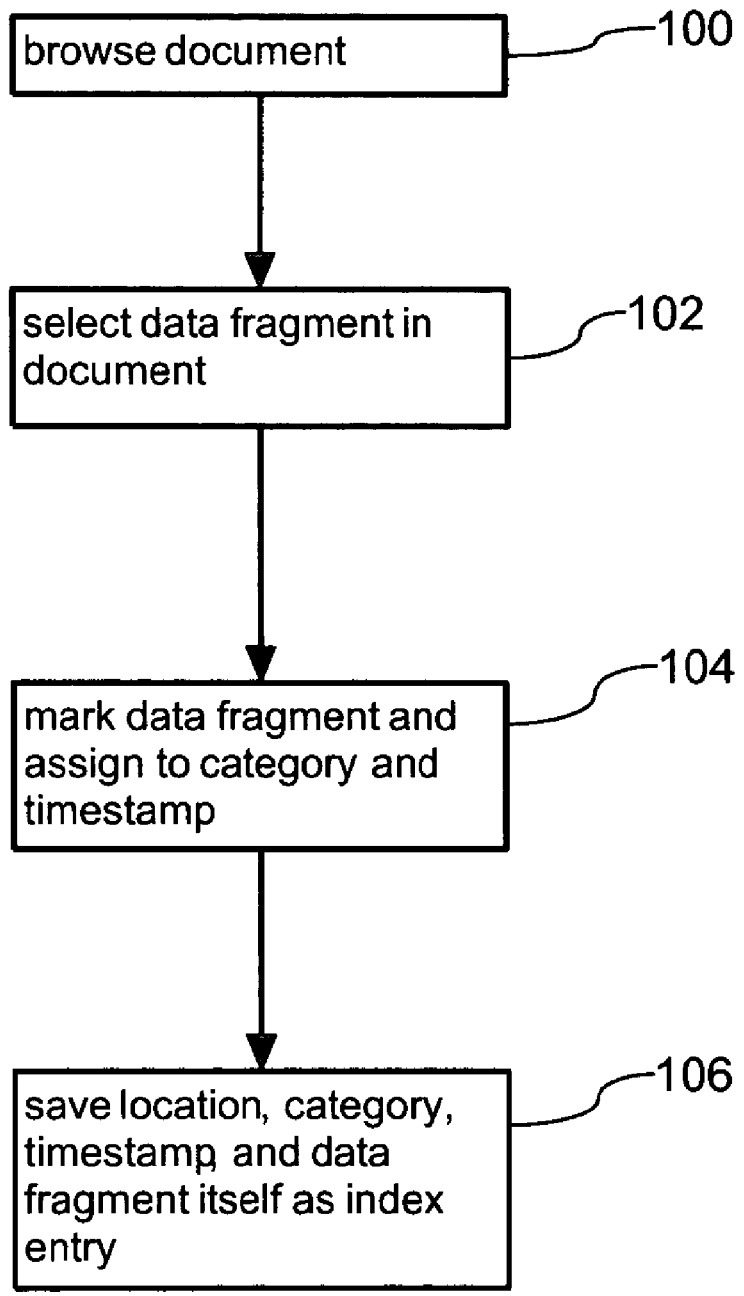
FIG. 1 is indicative of a flow chart for generating the index.

The present invention relates generally to the field of structuring and retrieving data provided by a multiplicity of documents. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention provides a method of generating an index for a retrieval and structuring of data provided by a multiplicity of electronic documents. The index comprises a number of index entries. The generation of such an index entry is based on the steps of selecting a data fragment within a document, assigning a category to the selected data fragment, assigning a timestamp to the selected data fragment and storing the selected data fragment, the category, the timestamp and a location indication of the selected data fragment as an entry of the index.

When, for example, a user is browsing the internet and thereby retrieves a text passage that is of certain relevance to the user, the user can select the entire text passage and assign a user defined category to the selected passage. This assignment as well as the selected text passage itself is stored as an index entry. The index entry further contains a location indication as well as additional information about the text passage, such as a timestamp. Once the index entry has been generated and stored, it can be used to retrieve the relevant text passage as well as the original document from which the text passage has been extracted. In this way an indexing and structuring of a plurality of electronic documents can be performed according to a user's preference irrespectively of hyperlinks or similar marks that are inserted in the documents by the authors.

According to a further preferred embodiment of the invention, the generation of the index is based on textual and/or graphical documents. In case when a text portion is selected by the user, the selected text portion is directly inserted in a list entry. Otherwise, when a graphical portion of the document, such as a picture is selected, the picture is miniaturized and the miniaturized version of the picture is inserted in a list entry as a thumbnail. When later on such a thumbnail is selected in the index, the method returns the original picture as well as the original document.

The method explicitly covers all common electronic text and graphics formats. Applying the index generation to documents containing combinations of textual and/or graphical or even acoustic types of information are also conceivable.

According to a further preferred embodiment of the invention, the method is applicable to all types of electronic documents irrespectively of the location where these documents are stored. For example, a document can be stored on a computer system which is accessible via the internet. The document can also be stored on a file system of a local computer system. Therefore the location indication of a data fragment stored in the index either comprises a link being indicative of an address of the relevant document or comprising a path to the relevant document.

In this way the method is universally applicable and can be implemented into various applications that make use of e.g., the internet, intranet, a local area network, a file browsing system as well as text and/or graphics processing applications.

According to a further preferred embodiment of the invention, a selected data fragment is further assigned to a relevance indication. This relevance indication is also stored in the appropriate index entry. In this way an effective and easy ranking of selected data fragments can be performed. The relevance indication is typically represented by a number or some sort of flag. When, for example, a user wants to collect information about a certain topic by making use of a search engine, a plurality of different documents is typically provided to the user by the search engine. The user then has to decide which of the provided documents matches the topic the user has in mind.

While browsing through the provided search results the user may retrieve various text passages having a varying relevance to the given topic. By assigning these text passages to a distinct relevance indication, a ranking of documents or ranking of text passages can be performed on the basis of the generated index.

According to a further preferred embodiment of the invention, the generated index can be sorted according to the user's specification. A sorting can be performed with respect to each of the assigned specifications of an index entry. In this way the index entries can be rearranged according to their relevance indication or timestamp or category or combinations of these specifications. For example the index can be sorted according to the categories assigned to the index entries. Since a plurality of index entries may belong to the same category, a further structuring or rearranging with respect to e.g. the relevance indication is conceivable.

Due to the fact, that the index entries are assigned to data fragments gathered from a huge variety of different documents distributed over a plurality of computer systems or computer networks, a contextual structuring and rearranging of the index finally leads to a contextual structuring of the data fragments and a logical restructuring of the appropriate documents.

According to a further preferred embodiment of the invention, the data fragment and the corresponding document are provided in response to a selection of the corresponding index entry. The selection of an index entry is typically performed by making use of a graphical user interface in combination with some kind of input means, such as e.g., a computer mouse or a computer keyboard.

Once an index entry is selected by the user, the method retrieves the corresponding document and inherently performs a search of the relevant data fragment gathered from the document and stored in the index entry. Therefore the method not only provides a retrieval of a document but also an efficient recovery of relevant text passages of a document.

The selection of relevant text passages in a plurality of documents distributed over a huge computer network system as well as the assignment of these text passages with some kind of category, relevance indication and timestamp provides an efficient and intuitive approach of contextual structuring of information irrespectively of the location of the information and irrespective of the type of information. By browsing through text documents or web pages the user can fully concentrate on the context and content of the provided information for structuring the provided data according to his or her preferences. The user no longer needs to take care of different document types and various locations of the documents.

According to a further preferred embodiment of the invention, the assignment of a category to a data fragment is performed in response to a set of categories which is suggested by the method. A set of different categories is either implemented in a predefined way or can be generated by the user according to the user's individual preferences. Once a set of categories is known and implemented into an existing index, the method makes explicit use of such categories. When, for example, a data fragment within a document has been selected by the user, the method automatically provides a list of known categories to which the selected data fragment may be assigned. The explicit appearance of the list can be fully controlled by the user. The user can, for example specify whether the categories or the list of categories appear in alphabetical, numerical or some other distinct order.

According to a further preferred embodiment of the invention, the method performs a pre-selection of a category which is likely to be assigned to a selected data fragment. Such a pre-selection can, for example, be performed by making use of a data mining technique. For the purpose of data mining commercially available products, such as "DB2 Intelligent Miner For Data" of IBM Corporation can be implemented. By making use of various data mining algorithms, a data mining product evaluates the content of a selected data fragment. According to such an evaluation, a single or a set of categories is provided to the user that are most likely to match a selected data fragment.

The user then has the final decision of assigning one of the suggested categories to a selected data fragment. The user can simply accept or reject categories suggested by the method. In case of rejection, the user can further define a new category or manually select one of the previously defined categories.

According to a further preferred embodiment of the invention, the timestamp assigned to an index entry can be used to generate a reminder for the user. This provides not only a contextual structuring of documents and data fragments but also a temporal structuring of related data. When, for example, the user tracks down a certain text passage not being of actual relevance but which might become relevant in the near future, the user can specify a time frame for which this distinct text passage is stored as a hidden entry in the index. When the assigned time frame has passed, this distinct index entry changes its status from hidden to non-hidden and it appears in the index.

Additionally the user can further specify a reminder function. According to user defined specifications of such a reminder function various index entries can be highlighted or emphasized in the index list when an appropriate time frame has passed.

According to a further preferred embodiment of the invention, the method is equipped with scanning means for performing a query of the index. By selecting a document the scanning means use the location indication of the selected document as a key in order to provide a category assigned to the selected document. In this way information about the categories being assigned to a selected document are provided to the user without the user opening and manually browsing the selected document.

Implementing this kind of scanning feature into a file or web browser is extremely advantageous for a time efficient browsing of documents. For example an implementation into a file browser, such as Microsoft Explorer results in a generation and visualization of a set of categories being assigned to a folder or a document file when the user selects the corresponding folder or document file by clicking a mouse button. In this way the user is immediately supplied with contextual information of a selected folder or of a selected document file. The user no longer has to open a document and to perform a manual search whether the document is related to a category the user has in mind.

Alternatively, a scanning can also be performed with respect to predefined keywords. A keyword then serves as a search string defining characteristic phrases or word sequences that are relevant for the user. The method then autonomously performs a query of a document with respect to the predefined keywords. When a matching between a predefined keyword and a phrase or sequence of words within a document can be found, the method provides a matching indication e.g. in form of a color-coded or flashing mouse pointer, or by generating a signal icon. The scanning is performed autonomously by the method without any user action. Only when relevant text phrases have been identified and corresponding indications are provided to a user, the method provides the corresponding text phrases or word sequences in response to a user's request.

According to a further preferred embodiment of the invention, the scope of the scanning can either be restricted to a predefined index, or to a multiplicity of different index entries. In this way scanning of a document or multiple documents with respect to a predefined keyword makes only use of a restricted amount of documents, that are assigned to a specified index entry. Alternatively, the scope of scanning can be expanded to documents being related to a multiplicity of various index entries.

Moreover, the scanning feature can be expanded to interlink multiple documents. When for example a multiplicity of different documents is assigned to the same index entry, selecting one of the multiplicity of documents provides an entire document tree being indicative of the location, the categories and the relevance of all other documents of the multiplicity of documents being assigned to that index entry. In this way the method of index generation allows to interlink documents by means of the assigned index entry or category.

Finally, a system and method in accordance with the present invention can be implemented on a computer readable medium such as a CD, DVD, floppy disk, FLASH media or any other such media.

To describe the present invention in more detail refer now to the following description in conjunction with the accompanying figures. The FIG. 1 shows a flow chart for generating a list entry. In step 100, a user browses an electronic document which can either be located on a local file system or be provided by some kind of computer network. When the user has found a relevant data fragment e.g. in form of a text passage, the user selects the data fragment within the document in step 102. The selection of the relevant data fragment can be performed by means of some pointing device as for example a conventional mouse pointer. After the relevant data fragment has been selected in step 102 it is assigned to a category and to a timestamp in step 104. The method inherently extracts the address or the path of the document providing the relevant data fragment. The location indication of the data fragment in form of the path or address, the category, the timestamp and the data fragment itself are stored as an index entry within the index in the last step 106. An index entry therefore comprises different index items that are preferably stored in columns of the index whereas an index entry is preferably stored as a row of the index.

Figure 2:
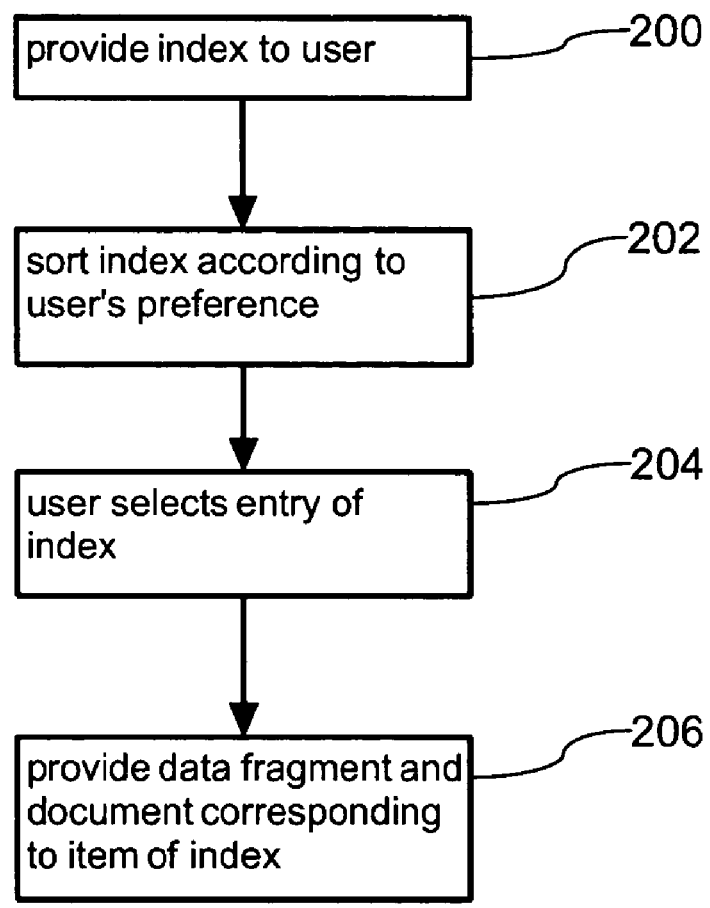
FIG. 2 is illustrative of retrieving data fragments by making use of the index.

FIG. 2 illustrates a flow chart for retrieving a document by making use of the generated index. In the first step 200, the index is provided to the user. In the next step 202, the user may sort or rearrange the provided index according to his or her preferences. The index can be rearranged with respect to the different index items of the index entries. For example the index can be sorted according to the alphabetic order of the assigned categories. Alternatively the index may be rearranged in a chronological way according to the timestamps assigned to each index entry.

In step 204 the user selects an entry of the index and the method provides the data fragment and retrieves the document of the corresponding index item in step 206 in response to the user selection of step 204. The retrieval of the document in step 206 makes explicit use of the location indication being assigned to the index item. Reliable retrieval of documents requires, that the location of the document has not changed between the generation of the index entry and usage of said index entry.

Figure 3:
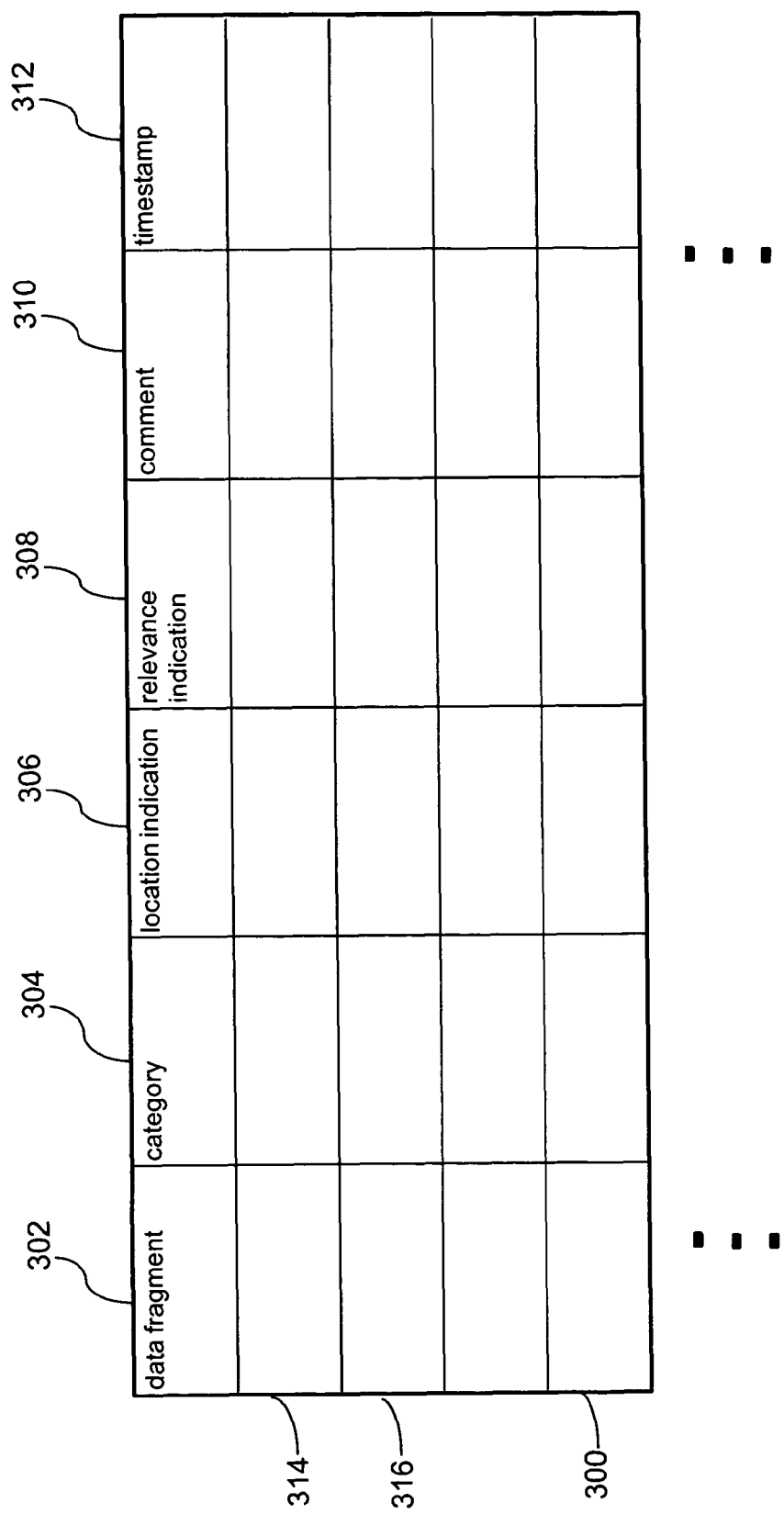
FIG. 3 shows a block diagram of the index.

FIG. 3 shows a block diagram of an index 300. Here the index 300 is arranged as a two dimensional matrix. The index entries 314 and 316 are represented as rows and the corresponding index items of data fragment 302, category 304, location 306, relevance indication 308, user command 310 and timestamp 312 are arranged as columns of the index 300.

Among the listed index items the items of data fragment 302, category 304 and timestamp 312 are essential for the method of the present invention.

The user can further specify how a newly created index entry is appended to the index. Furthermore the size of the index 300, i.e. the number of index entries, depends on the user's browsing behavior. A user at any time has full access to the index and can modify as well as delete various index entries or index items.

Figure 4:
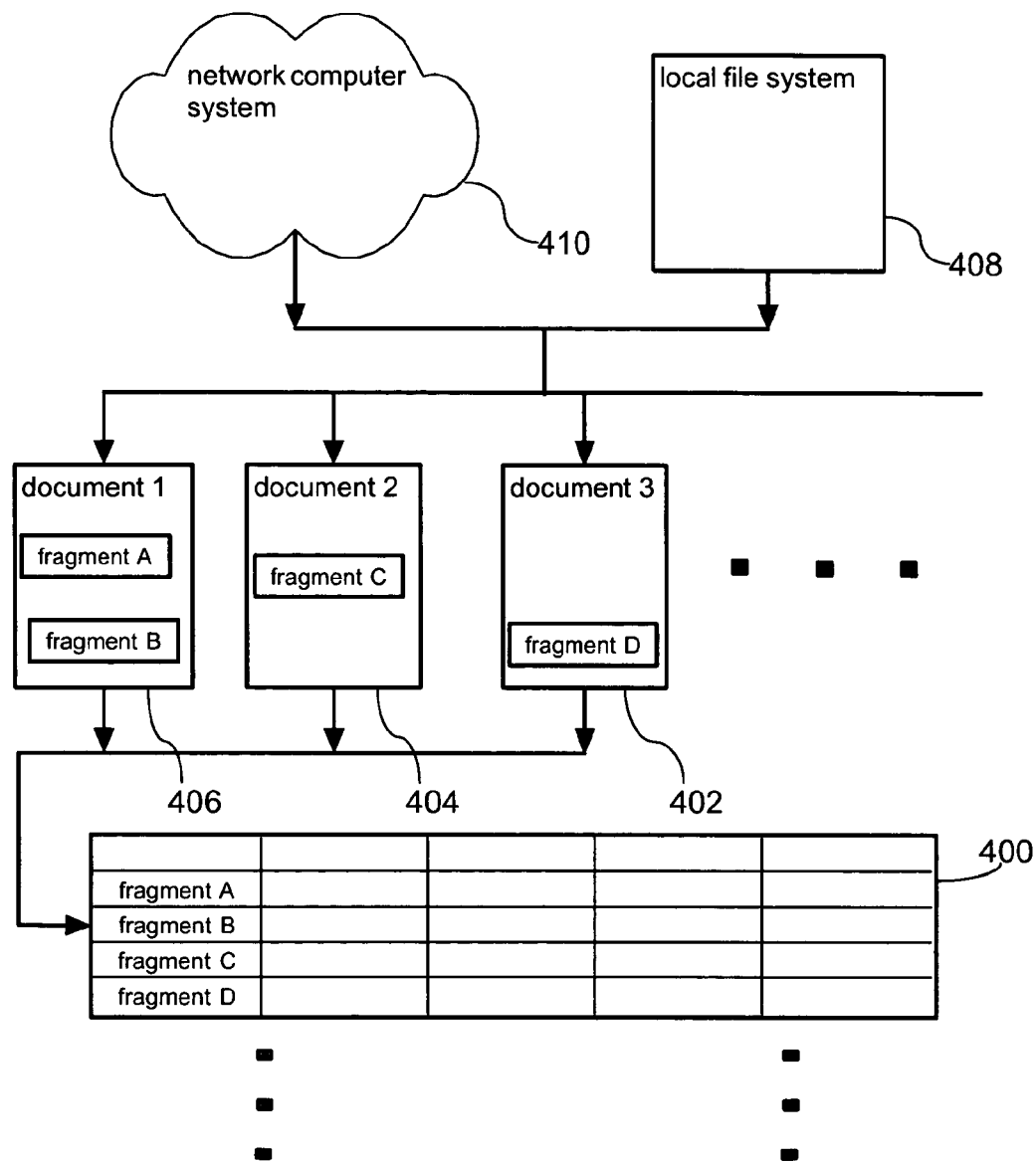
FIG. 4 shows a block diagram illustrating the relation between index entries and documents.

FIG. 4 shows a block diagram of system components of the present invention. An index 400 with four index entries denoted as fragment A, B, C and D is linked to a plurality of documents denoted as document 3 402, document 2 404 and document 1 406. The documents 402, 404 and 406 are provided by a network computer system 410 or by a local file system 408.

Document 1 406 contains fragment A and fragment B. Document 2 404 contains fragment C and document 3 402 contains fragment D. The fragments A, B, C, and D are provided by the list 400 and can be selected by the user. Since the list entry denoted as fragment A comprises a location indication of the fragment A, a selection of fragment A leads to a retrieval of the corresponding document 1 406. Selection of the other fragments activates corresponding steps.

Figure 5:
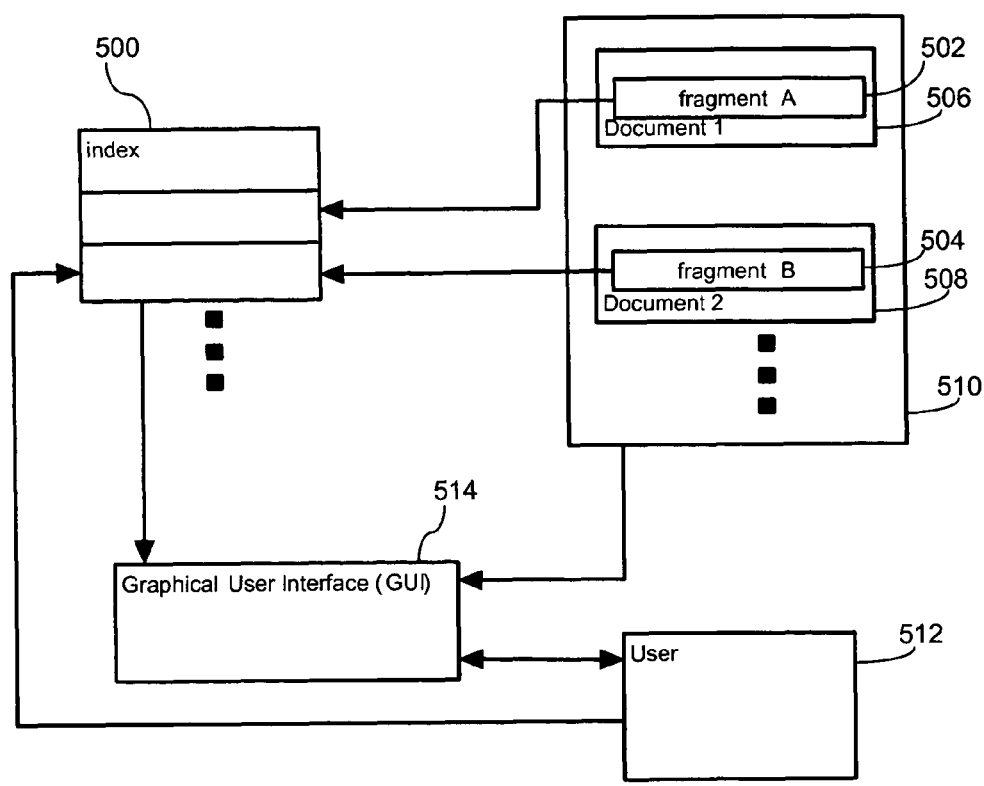
FIG. 5 illustrates a block diagram of the system components of the invention.

FIG. 5 illustrates a block diagram of a system implementation of the present invention. Here the index 500 is linked to data fragment A 502 and data fragment B 504 of document 1 506 and document 2 508. The documents 506, 508 are located in a file system 510. The index 500 as well as the file system 510 and the documents 506, 508 have access to a graphical user interface 514. The graphical user interface in turn provides the index as well as the documents of the file system 510 to a user 512. The user 512 interacts with the graphical user interface 514 in order to select data fragment A 502 within document 1 506. Furthermore the user 512 interacts with the index 500. Interaction between user 512 and index 500 is twofold since the user generates index entries on the one hand and makes use of generated index entries on the other hand.

Figure 6:
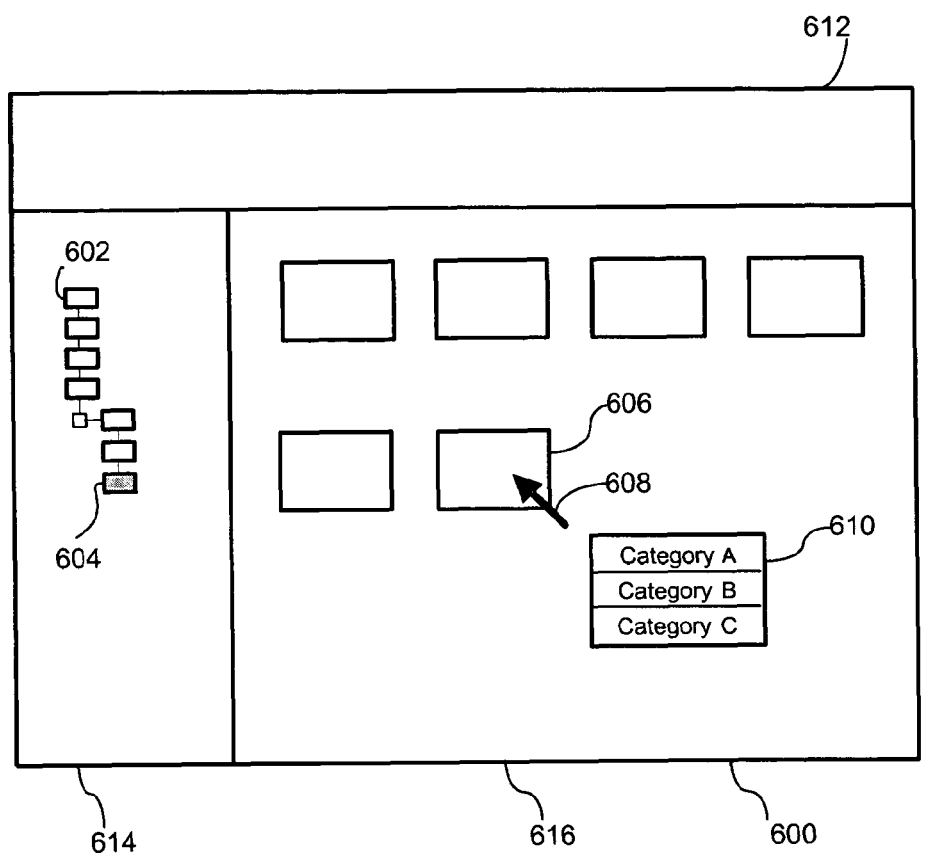
FIG. 6 illustrates an implementation of a scanning feature into a file browser.

FIG. 6 shows a block diagram of an implementation of the method of the invention into a common file browser. The file browser 600 is divided into three frames. The menu frame 612 provides various user menus for performing operations of the file system. The directory frame 614 provides a graphical representation of the directory tree of the underlying file system. The file frame 616 finally provides a graphical representation of a selected directory 604 of the directory tree 602 illustrated in the directory frame 614. The selected directory 604 has several files as well as sub-directories illustrated in the file frame, 616.

The file 606, located in the directory 604 can be selected with the mouse pointer 608. In response to this selection of the file 606 the system provides a context menu 610 being indicative about the categories the file 606 is assigned to. In this way the user is provided with contextual information in form of categories without further processing of a file or a directory. In the same way as the context menu 610 applies to the file 606 this scanning feature can be applied to any directory, folder or file illustrated by the file browser 600.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer system for generating an index for a retrieval of data provided by at least one document, the computer system comprising:
 means for selecting data within the at least one document;
 means for assigning a category to the selected data;
 means for assigning a timestamp to the selected data;
 means for determining a location to the selected data; and
 means for storing the selected data, the category, the timestamp and a location indication of the selected data as an entry of the index.

2. The computer system according to claim 1, wherein the data is represented in textual and/or graphical form.

3. The computer system according to claim 1, wherein the location indication of the selected data either comprises a link or a path to the at least one document stored on a computer network or stored on a local file system of the computer system.

4. The computer system according to claim 2, wherein the location indication of the selected data either comprises a link or a path to the at least one document stored on a computer network or stored on a local file system of the computer system.

5. The computer system according to claim 1, further comprising means for providing the selected data and the corresponding document in response to a selection of the corresponding entry of the index.

6. The computer system according to claim 2, further comprising means for providing the selected data and the corresponding document in response to a selection of the corresponding entry of the index.

7. The computer system according to claim 3, further comprising means for providing the selected data and the corresponding document in response to a selection of the corresponding entry of the index.

8. The computer system according to claim 1, the means for assigning a category to selected being adapted to perform:
 providing a set of categories in form of a context menu on a graphical user interface;
 suggesting one category of the set of categories to be assigned to the selected data; and
 assigning a category to the selected data in response to a user accepting or rejecting the suggested category.

9. The computer system according to claim 2, the means for assigning a category to selected being adapted to perform:
 providing a set of categories in form of a context menu on a graphical user interface;
 suggesting one category of the set of categories to be assigned to the selected data; and
 assigning a category to the selected data in response to a user accepting or rejecting the suggested category.

10. The computer system according to claim 3, the means for assigning a category to selected being adapted to perform:
 providing a set of categories in form of a context menu on a graphical user interface;
 suggesting one category of the set of categories to be assigned to the selected data; and
 assigning a category to the selected data in response to a user accepting or rejecting the suggested category.

11. The computer system according to claim 4, the means for assigning a category to selected being adapted to perform:
 providing a set of categories in form of a context menu on a graphical user interface;
 suggesting one category of the set of categories to be assigned to the selected data; and
 assigning a category to the selected data in response to a user accepting or rejecting the suggested category.

12. The computer system according to claim 3, the means for assigning a category to selected being adapted to perform:
 providing a set of categories in form of a context menu on a graphical user interface;
 suggesting one category of the set of categories to be assigned to the selected data; and
 assigning a category to the selected data in response to a user accepting or rejecting the suggested category.

13. The computer system according to claim 1, further comprising scanning means for performing querying the index using the location indication of the selected document as a key in order to provide a category assigned to the selected document.

14. The computer system according to claim 2, further comprising scanning means for performing querying the index using the location indication of the selected document as a key in order to provide a category assigned to the selected document.

15. The computer system according to claim 3, further comprising scanning means for performing querying the index using the location indication of the selected document as a key in order to provide a category assigned to the selected document.

16. The computer system according to claim 4, further comprising scanning means for performing querying the index using the location indication of the selected document as a key in order to provide a category assigned to the selected document.

17. The computer system according to claim 5, further comprising scanning means for performing querying the index using the location indication of the selected document as a key in order to provide a category assigned to the selected document.

18. The computer system according to claim 6, further comprising scanning means for performing querying the index using the location indication of the selected document as a key in order to provide a category assigned to the selected document.

19. The computer system according to claim 7, further comprising scanning means for performing querying the index using the location indication of the selected document as a key in order to provide a category assigned to the selected document.

20. A computer readable medium containing program instructions for generating an index for a retrieval of data provided by at least one document, the generation of an index entry, the program instructions for:
 selecting data within the at least one document;
 assigning a category to the selected data;
 assigning a timestamp to the selected data;
 determining a location indication to the selected data; and
 storing the selected data, the category, the timestamp and a location indication of the selected data as an entry of the index.

21. The computer readable medium containing program instructions according to claim 20, wherein the data is represented in textual and/or graphical form.

22. The computer readable medium containing program instructions according to claim 20, wherein the location indication of the selected data either comprises a link or a path to the at least one document stored on a computer network or stored on a local file system of a computer system.

23. The computer readable medium containing program instructions according to claim 21, wherein the location indication of the selected data either comprises a link or a path to the at least one document stored on a computer network or stored on a local file system of a computer system.

24. The computer readable medium containing program instructions according to claim 20, the computer program product further comprising program means for sorting the index according to the assigned category, the assigned timestamp or according to a user's specification.

25. The computer readable medium containing program instructions according to claim 21, further comprising program means for sorting the index according to the assigned category, the assigned timestamp or according to a user's specification.

26. The computer readable medium containing program instructions according to claim 23, further comprising program means for sorting the index according to the assigned category, the assigned timestamp or according to a user's specification.

27. The computer readable medium containing program instructions according to claim 24, further comprising program means for sorting the index according to the assigned category, the assigned timestamp or according to a user's specification.

28. The computer readable medium according to claim 20, the assigning of a category to selected data further comprising program means for:
- providing a set of categories in form of a context menu on a graphical user interface;
- suggesting one of the set of categories to be assigned to the selected data; and
- assigning a category to the selected data in response to a user accepting or rejecting the suggested category.

29. The computer readable medium according to claim 21, the assigning of a category to selected data further comprising program means for:
- providing a set of categories in form of a context menu on a graphical user interface;
- suggesting one of the set of categories to be assigned to the selected data; and
- assigning a category to the selected data in response to a user accepting or rejecting the suggested category.

30. The computer readable medium according to claim 23, the assigning of a category to selected data further comprising program means for:
- providing a set of categories in form of a context menu on a graphical user interface;
- suggesting one of the set of categories to be assigned to the selected data; and
- assigning a category to the selected data in response to a user accepting or rejecting the suggested category.

31. The computer readable medium according to claim 24, the assigning of a category to selected data further comprising program means for:
- providing a set of categories in form of a context menu on a graphical user interface;
- suggesting one of the set of categories to be assigned to the selected data; and
- assigning a category to the selected data in response to a user accepting or rejecting the suggested category.

32. The computer readable medium according to claim 25, the assigning of a category to selected data further comprising program means for:
- providing a set of categories in form of a context menu on a graphical user interface;
- suggesting one of the set of categories to be assigned to the selected data; and
- assigning a category to the selected data in response to a user accepting or rejecting the suggested category.

* * * * *